(12) United States Patent
Tolksdorf

(10) Patent No.: US 8,091,662 B2
(45) Date of Patent: Jan. 10, 2012

(54) HYBRID DRIVE FOR VEHICLES AND METHOD FOR CONTROLLING A TRANSMISSION FOR A HYBRID DRIVE

(75) Inventor: Detlef Tolksdorf, Essen (DE)

(73) Assignee: Hytrac GmbH, Essen (DE)

( * ) Notice: Subject to any disclaimer, the term of this patent is extended or adjusted under 35 U.S.C. 154(b) by 541 days.

(21) Appl. No.: 12/085,743

(22) PCT Filed: Nov. 29, 2006

(86) PCT No.: PCT/DE2006/002114
§ 371 (c)(1),
(2), (4) Date: Jan. 21, 2009

(87) PCT Pub. No.: WO2007/062630
PCT Pub. Date: Jun. 7, 2007

(65) Prior Publication Data
US 2009/0223727 A1    Sep. 10, 2009

(30) Foreign Application Priority Data

Dec. 2, 2005 (DE) .......................... 10 2005 057 607

(51) Int. Cl.
*B60K 6/485* (2007.10)
(52) U.S. Cl. ............. 180/65.26; 180/65.6; 475/2; 475/5
(58) Field of Classification Search ............. 180/65.225, 180/65.23, 65.235, 65.26, 65.27, 65.6, 65.7; 475/1, 2, 5, 150, 151
See application file for complete search history.

(56) References Cited

U.S. PATENT DOCUMENTS

| | | | |
|---|---|---|---|
| 4,411,171 A | 10/1983 | Fiala | |
| 6,054,776 A * | 4/2000 | Sumi | 290/17 |
| 6,146,302 A * | 11/2000 | Kashiwase | 475/5 |
| 6,251,037 B1 | 6/2001 | Baumgaertner et al. | |
| 6,945,894 B2 * | 9/2005 | Holmes | 475/5 |
| 7,053,566 B2 * | 5/2006 | Aizawa et al. | 318/34 |
| 7,220,201 B2 * | 5/2007 | Raghavan et al. | 475/5 |
| 7,220,203 B2 * | 5/2007 | Holmes et al. | 475/5 |
| 7,527,573 B2 * | 5/2009 | Lang et al. | 475/5 |
| 2006/0046886 A1 | 3/2006 | Holmes et al. | |

FOREIGN PATENT DOCUMENTS

| | | |
|---|---|---|
| DE | 30 22 373 | 12/1981 |
| DE | 41 24 479 | 1/1993 |
| DE | 198 18 108 | 11/1998 |
| DE | 198 41 828 | 3/2000 |
| DE | 10 2005 022011 | 12/2005 |
| EP | 0 925 981 | 6/1999 |
| EP | 1 247 679 | 10/2002 |
| EP | 1 524 145 | 4/2005 |
| WO | WO-2005/097532 | 10/2005 |

* cited by examiner

*Primary Examiner* — John Walters
(74) *Attorney, Agent, or Firm* — Jordan and Hamburg LLP

(57) ABSTRACT

A hybrid drive for vehicles includes at least a main engine, especially an internal combustion engine, a generator, an electric engine, and a planetary transmission including a sun wheel, an internal-geared wheel, a planet carrier, and planet wheels. The planetary transmission also includes at least one output shaft. For a first driving mode of the vehicle, the drive shafts of the main engine and the electric engine are coupled to the sun wheel of the planetary transmission, for the addition of the torques, and, for another driving mode of one of the engines, one of the two engines can be coupled to the internal-geared wheel of the planetary transmission in a non-positive manner, for the mechanical addition of the rotational speeds according to the superposition principle.

11 Claims, 4 Drawing Sheets

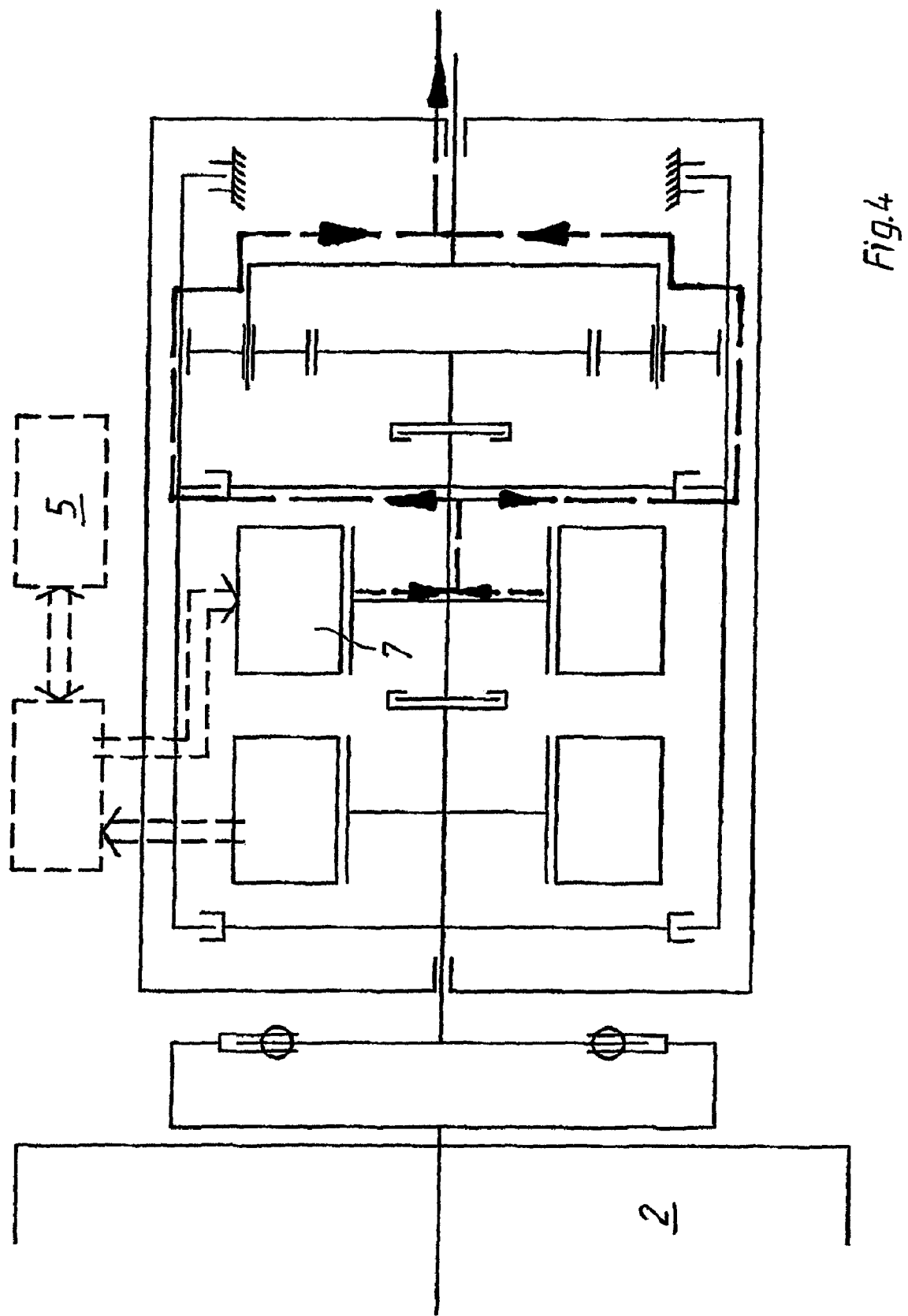

HYBRID DRIVE FOR VEHICLES AND METHOD FOR CONTROLLING A TRANSMISSION FOR A HYBRID DRIVE

BACKGROUND OF THE INVENTION

The invention relates to a hybrid drive for vehicles.

An article was published in the Engineering and Economy section of VDI Nachrichten, issue dated 21 Jan. 2005, No. 3, that explains mixed drives (hybrid drives) comprised of internal combustion engines and electric engines for automobiles. A mixed drive is described therein, that is made from a gasoline engine and an electric engine. In normal operation, the engine power is branched. A portion of the power flows directly via a planetary gear and the other portion of the power flows via a generator and the electric engine, a rechargeable battery being fed. Each power branch is oriented toward attaining the highest possible efficiency for the total system.

A report by the Chemnitz University of Technology, that was published on the Internet, concerns a stepless vehicle transmission with electromechanical power branching (SEL), which has to do with the mixed drive described in the foregoing. It is considered a serious disadvantage of the previously addressed transmission, that the output torque can never be greater than the total of the torques from the ring gear and electric engine on the output side. In this design, the ring gear torque is always lower than the path torque or torque of the combustion engine, which is itself low, no more than 150 Nm. Even a light vehicle requires output torques of 600 Nm or more for high accelerations and high climbing ability. With the drive design addressed in the foregoing this requires a very large drive.

The suggested first principle is retained with the SEL design that is also described in the TU Chemnitz article, but the disadvantages are eliminated. In addition it is suggested that for building higher output torques, the ring gear torque of the shaft is transmitted to the output in a further planetary gear step with high transmission ratio. In this way, the two planet wheel steps then should effect a high transmission ratio, wherein it is possible to produce drive torques greater than 1000 Nm.

Even if it is possible to provide a positive refinement in terms of the output torque by such approach, it is still disadvantageous that a second planetary step must be used that makes the transmission more expensive.

The goal of the subject-matter of the invention is to further develop the prior art such that when using a single planetary gear, or a single planetary gear step, mechanically linked to a relatively small electric engine and also with significantly reduced shifting, it is still possible to factor in the maximum capacity in each of the speed ranges for the vehicle.

SUMMARY OF THE INVENTION

This goal is attained using a hybrid drive for vehicles, each that at least contains a main engine, in particular an internal combustion engine, a generator, an electric engine, and a planetary gear that has a sun wheel, a ring gear, a planet carrier, and planet wheels, and contains at least one output shaft, whereby for a first driving mode of the vehicle, for adding the torques, the drive shafts of the main engine and of the electric engine are coupled to the sun wheel of the planetary gear, and for another driving mode, for mechanically adding the torques, one of the two engines can be coupled to the ring gear of the planetary gear in a non-positive fit according to the principle of superimposition.

Advantageous refinements of the above subject matter provide further features in accordance with the invention.

The goal is also attained using a method for controlling a transmission for a hybrid drive that contains at least two engines that are connected to one another via a clutch and at least one planetary gear that has at least one drive shaft, and the ring gear of which can be fixed via at least one brake, in such manner that the engines in a first driving mode are switched together such that torque is added and one of the engines is switched via at least one additional clutch, so that in another driving mode, the engines are operated such that torque is added.

Advantageous refinements of the above are also described herein.

Thus, in refining the prior art, only a single planetary gear, or a single planetary gear step, is used, that is mechanically linked to an electric engine that is dimensioned small while maintaining power.

As needed, the inventive hybrid drive can be equipped with a conventional hydrodynamic converter, as is normal in automatic transmissions, with a lockup clutch, so that while there is good idling behavior, jolt-free shifting is also concomitantly possible from the low (first) speed range to the high (next) speed range.

With the subject matter according to the invention, the main engine, which is embodied as an internal combustion engine, can always be maintained in the optimal speed range via a control. Thus, in addition to the positive effects of a hybrid drive that are already known, additional fuel can be saved, as well.

According to an advantageous feature of the invention, the hybrid drive is activated using electronics acting as engine management such that operation of the hybrid drive is optimized in terms of consumption via selector switches.

In accordance to another advantageous feature, the hybrid drive is activated using electronics acting as engine management such that said hybrid drive is operated in a mode for maximum acceleration ability via selector switches.

The inventive hybrid drive can be used in all vehicles: This applies, inter alia, to automobiles, trucks, buses, utility vehicles, special purpose vehicles, agricultural machines, and the like. When the power parameters of the internal combustion engine and electric engine are adjusted appropriately, it is also possible to use this hybrid drive in watercraft (sport boats and freighters). The subject matter according to the invention is depicted in the drawings using an exemplary embodiment and is described as follows, wherein the different figures depict different operating circumstances for a hybrid drive for a vehicle, for instance an automobile, wherein only the function is described, but not the specific design structure of the hybrid drive.

BRIEF DESCRIPTION OF THE DRAWINGS

FIG. 4 illustrates the principle of the drive scheme for a vehicle hybrid drive that is only driven with the electric engine, specifically in battery mode with the internal combustion engine turned off.

DETAILED DESCRIPTION OF THE INVENTION

Figure 1:
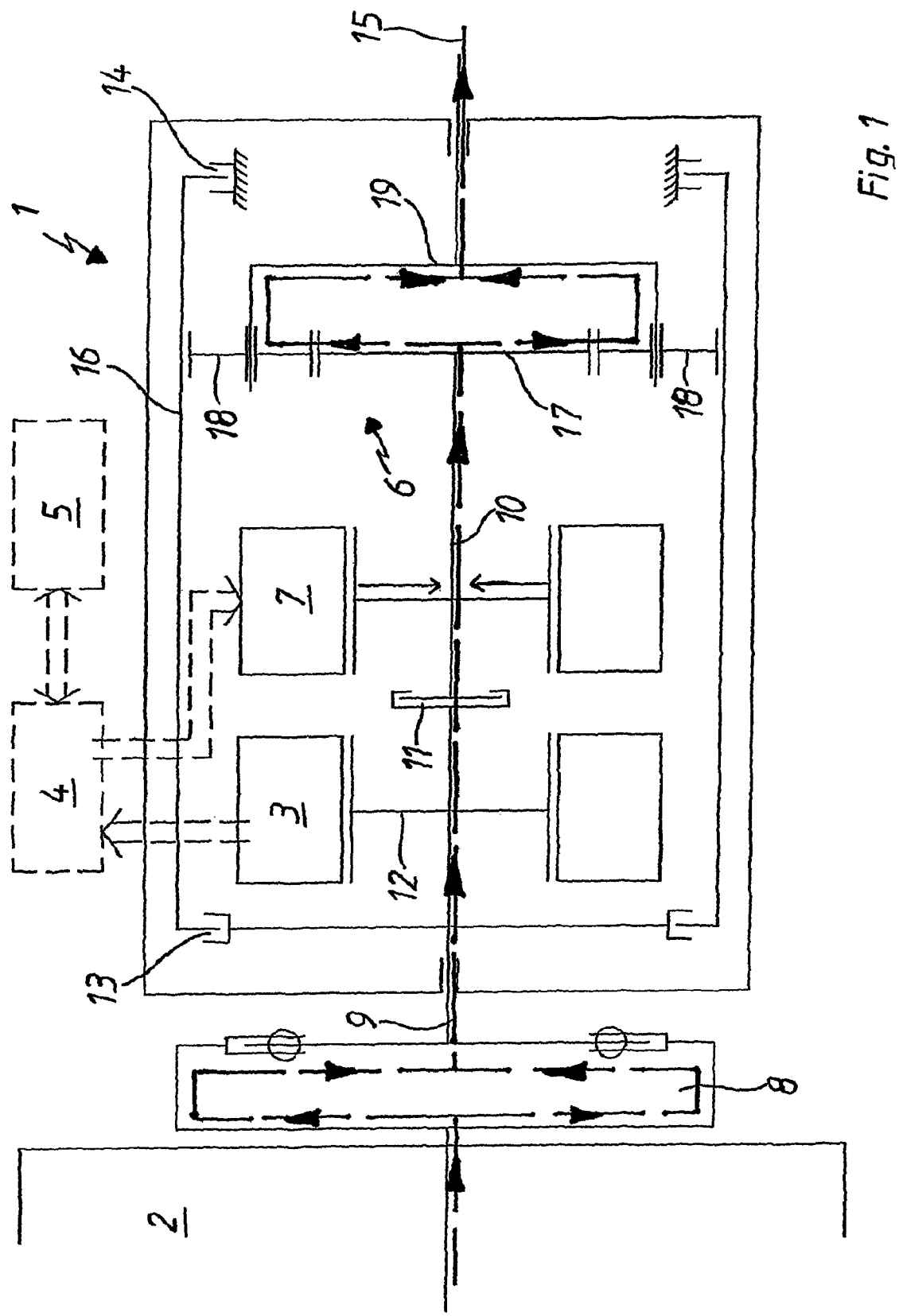
FIG. 1 illustrates the principle of the drive scheme for a vehicle hybrid drive that can be moved in a first driving mode at low speed.

FIG. 1 illustrates the principle of the drive scheme for the inventive hybrid drive 1. As depicted, essential components thereof include an internal combustion engine, for instance an otto, diesel, natural gas engine, embodied as the main engine 2, an electrical generator 3, a control 4, an accumulator 5, a planetary gear 6 (powershift transmission), an electric engine 7, and a hydrodynamic converter 8. The hydrodynamic converter 8, which is normally used in such hybrid drives, ensures that no drive energy can be transmitted to the wheels of the vehicle when the vehicle is idling. In effect, it forms another clutch. The main engine 2 acts on an input-side drive shaft 9, while the electric engine 7 drives an input-side drive shaft 10. The drive shafts 9 and 10 can be mechanically connected to one another via a clutch 11. A toothed wheel 12 drives the generator 3. Additional components of the hybrid drive are formed by another clutch 13, a brake 14, and a common output shaft 15 on the output of the planetary gear 6. Moreover, a ring gear 16, sun wheel 17, planetary wheels 18, and a planet carrier 19 (bar) are arranged within the planetary gear 6.

The drive scheme depicted in FIG. 1 illustrates the power flow in the first driving mode of a vehicle, in this example, an automobile. The power flow in this driving mode is indicated by the arrows. Via its drive shaft 9, the main engine 2 drives the sun wheel 17 of the planetary gear 6 directly. The torque of the main engine 2 is transmitted via the planet wheels 18 to the planet carrier 19 of the planetary gear 6 and thus to the (in this case, the only) drive shaft 15 connected thereto. Via its drive shaft 10, the electric engine 7 likewise drives the sun wheel 17. The clutch 11 is closed in this driving mode. The torques of the two engines 2, 7 are thus added in the area of the drive shafts 9, 10 and transmitted as illustrated via sun wheel 17, planets 18, and planet carrier 19 to the output shaft 15 of the planetary gear 6. In this driving mode, the ring gear 16 is fixed via the brake 14 and the clutch 13 is open, that is, it is inactive. Based on the present drive regulation, in this low driving mode, driving speeds of up to 50 km/h can be attained.

In this gear speed, for a purely electric drive, for instance, the main engine 2 can be turned off and the clutch 11 can be opened. The power flow is otherwise identical to FIG. 1, specifically, the electric engine 7 transmits its power via its drive shaft 10 and the planetary gear 6 to the output shaft 15.

Figure 2:
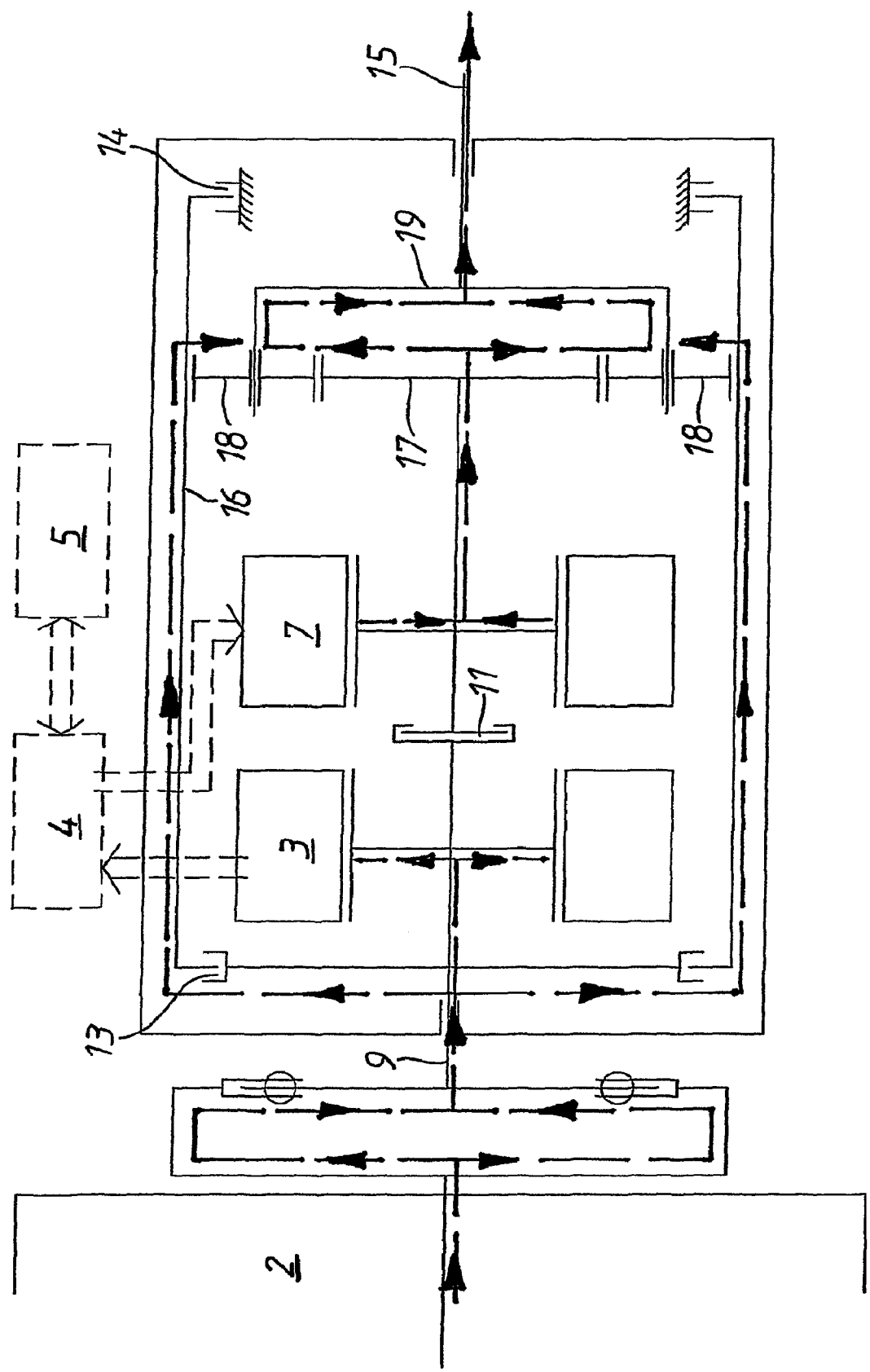
FIG. 2 illustrates the principle of the drive scheme for a vehicle hybrid drive that can be moved in a second driving mode at a higher speed.

FIG. 2 depicts the same drive scheme as is illustrated in FIG. 1, so the same reference numbers apply. In this case, the second drive mode shall now be described for the vehicle, which is not described in greater detail. Analogous to FIG. 1, in FIG. 2 as well, the power flow for this second driving mode is marked with arrows. The speed of the main engine 2 is transmitted from the drive shaft 9 via the clutch 13, now closed, with the open brake 14, directly via the ring gear 16 and the planetary wheels 18 to the planet carrier 19 and thus to the output shaft 15. Because the clutch 11 is now open, the speed of the electric engine 7 is transmitted via the sun wheel 17 to the ring gear 16 and thus the speed of the main engine 2 is superimposed in an additive manner. The speeds of the engines 2 and 7 are transmitted via the planet wheels 18 to the planet carrier 19 and thus to the output shaft 15. In this depiction, the main engine 2 drives the generator 3, so that the accumulator 5 can be charged via the control 4. This second driving mode can be used without additional shifting processes for vehicle speeds above 50 km/h up to the terminal velocity of the vehicle.

Thus, a hybrid drive 1 for a vehicle is provided, which in this example, is driven by both engines 2, 7 in a first, low driving, mode, the torques output by the engines 2, 7 being added via the drive shafts 9, 10 and the closed clutch 11 to create a total torque. The total torque is conducted via the planetary gear 6 to the output shaft 15. In the second, high driving, mode, the electric engine 7 is not turned off but rather is shifted in that the clutch 11 is opened, the clutch 13 is closed, and the brake 14 is released. In this phase, the system acts as a differential gear. The speed introduced by the electric engine 7 is conducted via the sun wheel 17 to the ring gear 16 of the planetary gear 6 and the speed of the main engine 2 introduced via the ring gear 16 is superimposed or mechanically added up, in turn creating a high output speed on the output shaft 15, such that there is consequently a high vehicle speed in the high driving mode.

The advantage compared to the prior art is that it is possible to create two driving modes with two engines 2, 7 and a single planetary gear 6 in that in the first driving mode, both torques additively increase the total torque and the traction force of the vehicle (not shown in greater detail), and in the other driving mode, both torques additively increase the total speed or the speed of the vehicle.

Figure 3:
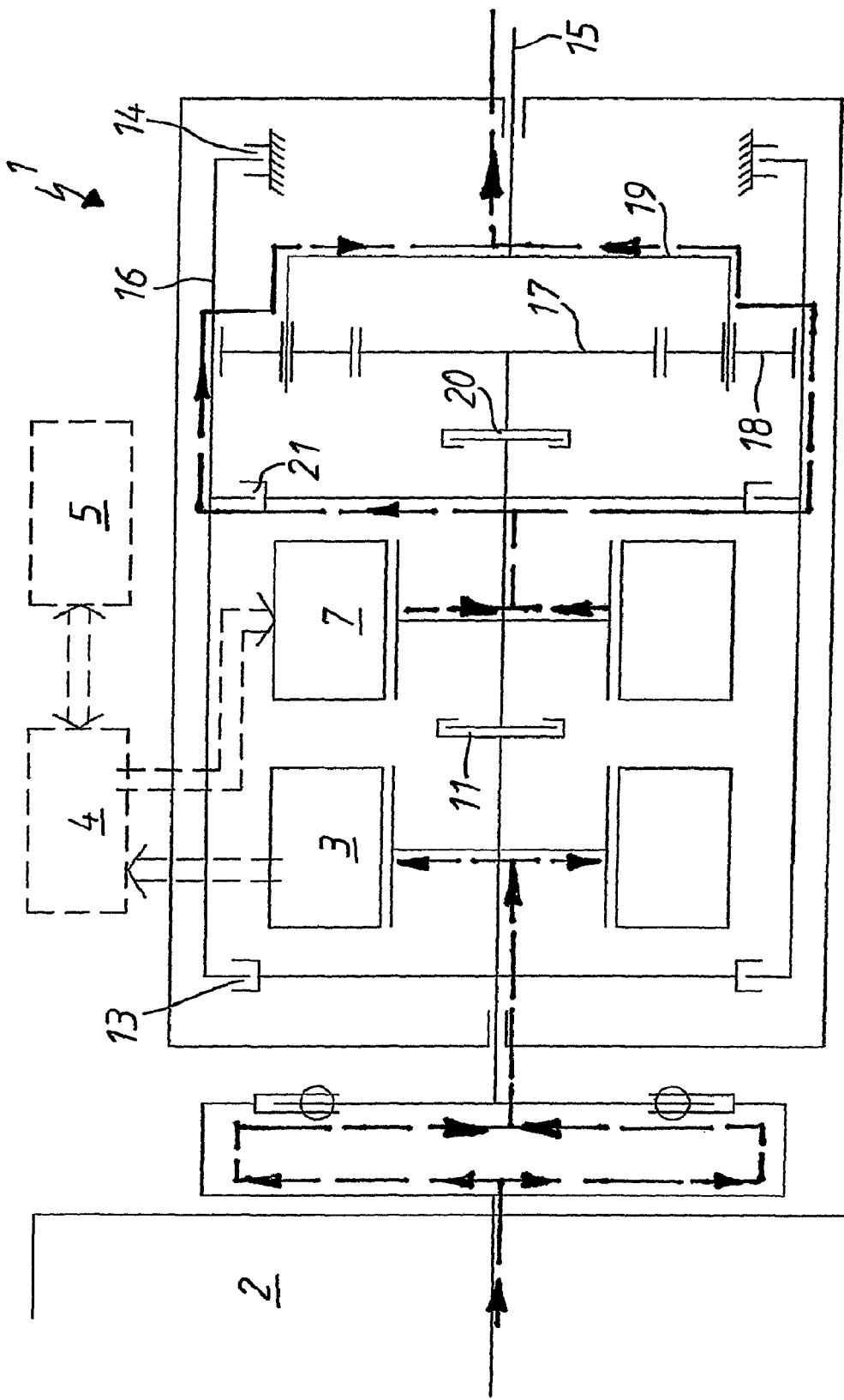
FIG. 3 illustrates the principle of the drive scheme for a vehicle hybrid drive that is only driven by the electric engine while an accumulator is charged by a generator via an internal combustion engine.

FIG. 3 illustrates the same drive scheme as is depicted in FIGS. 1 and 2, so that again, identical reference numbers are used for identical components. The purely electric driving mode for the hybrid drive 1 is depicted. In this mode, the clutch 11 is open. The clutch 13 is closed and the brake 14 is open. The main engine 2 drives the generator 3, which charges the accumulator 5 via the control 4. Additional clutches 20, 21 are provided for this embodiment. In this mode, the clutch 20 is open, the sun wheel 17 is fixed, and the clutch 21 is closed. The speed of the electric engine 7 is thus provided directly to the ring gear 16 and is transmitted from there via the planets 18 to the planet carrier 19 and the output shaft 15. This mode would approximately correspond to the high driving mode.

FIG. 4 is largely the same as FIG. 3, with the exception that the main engine 2 is not operating and the drive power is applied exclusively by the electric engine 7, which is supplied with electric power via the accumulator 5. The power flow is the same as that in FIG. 3.

Table 1 provides a comparison of the power data for a conventional 4-speed drive and the inventive hybrid drive. Compared to the conventional 4-speed drive, only a single shifting process is necessary for the inventive hybrid drive. When using an electric engine having low power, it is possible to attain largely the same maximum speeds and maximum forces for an automobile, for instance, with low structural complexity. This occurs by using the advantageous regulatability that characterizes the hybrid drives in terms of efficiency-optimized driving and reducing the need for fuel.

| References | |
|---|---|
| 1. | Hybrid drive |
| 2. | Drive main engine |
| 3. | Generator |
| 4. | Control |
| 5. | Accumulator |
| 6. | Planetary gear |
| 7. | Electric engine |
| 8. | Hydrodynamic converter (with lockup clutch) |

-continued

References

| | |
|---|---|
| 9. | Main engine drive shaft |
| 10. | Electric engine drive shaft |
| 11. | Clutch |
| 12. | Toothed wheel |
| 13. | Clutch |
| 14. | Brake |
| 15. | Output shaft |
| 16. | Ring gear |
| 17. | Sun wheel |
| 18. | Planet wheels |
| 19. | Planet carrier (bar) |
| 20. | Additional clutch |
| 21. | Additional clutch |

TABLE 1

| Conventional 4-speed drive in 1st gear | |
|---|---|
| Combustion engine power N [kW] | 65 |
| Max. output speed n [rpm] | 5500 |
| Torque at nmax Md [Nm] | 128 |
| Max output torque Md [Nm] | 160 |
| Gear ratio in 1st gear | 4.00 |
| Max. gear output speed in 1st gear | 1375 |
| Max. gear output torque in 1st gear | 461 |
| Transmission efficiency | 0.90 |
| Axle ratio | 3.50 |
| Axle efficiency | 0.90 |
| Wheel radius [m] | 0.30 |
| Max. vehicle speed (1st gear) [km/h] | 44 |
| Max. vehicle traction force (1st gear) [N] | 4838 |
| Conventional 4-speed drive in 4th gear | |
| Combustion engine power N [kW] | 85 |
| Max. output speed n [rpm] | 5500 |
| Torque at nmax Md [Nm] | 128 |
| Max output torque Md [Nm] | 160 |
| Gear ratio in 4th gear | 1.00 |
| Max. gear output speed in 4th gear | 5500 |
| Transmission efficiency | 0.90 |
| Axle ratio | 3.50 |
| Axle efficiency | 0.90 |
| Wheel radius [m] | 0.30 |
| Max. vehicle speed (4th gear) [km/h] | 178 |
| Hybrid drive in low driving mode (1st gear) | |
| Combustion engine power N [kW] | 50 |
| Max. output speed n [rpm] | 5500 |
| Torque at nmax Md [Nm] | 80 |
| Max output torque Md [Nm] | 100 |
| Electric engine power N [kW] | 35 |
| Max. output speed n [rpm] | 6000 |
| Max. output torque Md [Nm] | 54 |
| Gear ratio in 1st gear | 3.85 |
| Max. gear output speed in 1st gear | 1429 |
| Max. gear output torque in 1st gear | 464 |
| Transmission efficiency | 0.90 |
| Axle ratio | 3.50 |
| Axle efficiency | 0.90 |
| Wheel radius [m] | 0.30 |
| Max. vehicle speed (1st gear) [km/h] | 46 |
| Max. vehicle traction force (1st gear) [N] | 4875 |
| Hybrid drive in high driving mode (2nd gear) | |
| Combustion engine power N [kW] | 50 |
| Max. output speed n [rpm] | 5500 |
| Torque at nmax Md [Nm] | 80 |
| Max output torque Md [Nm] | 100 |
| Electric engine power N [kW] | 35 |
| Max. output speed n [rpm] | 6000 |
| Max. output torque Md [Nm] | 54 |
| Gear ratio in 2nd gear | 1.39 |
| Max. gear output speed in 2nd gear | 6515 |
| Transmission efficiency | 0.90 |
| Axle ratio | 3.50 |

TABLE 1-continued

| | |
|---|---|
| Axle efficiency | 0.90 |
| Wheel radius [m] | 0.30 |
| Max. vehicle speed (2nd gear) [km/h] | 178 |

In 2nd gear the E-engine is coupled to the sun wheel and the combustion engine is coupled to the ring gear
Planetary gear with ring gear tooth count $Z1 = 33$ and sun wheel tooth count $Z2 = 13$
$i1 = 3.85$ and $i2 = 1.39$

The invention claimed is:

1. A hybrid drive for a vehicle, comprising:
    at least a main engine in the form of an internal combustion engine;
    a generator;
    an electric drive;
    first and second drive shafts connected by a clutch and respectively to an output of said main engine and said electric drive;
    a planetary gear including a sun wheel, a ring gear, a planet carrier, and planet wheels, said planetary gear further including at least one output shaft, said first and second drive shafts of said respective main engine and said electric drive being couplable to said sun wheel of said planetary gear for adding respective torques thereof when in a first driving mode of the vehicle corresponding to a first range of speed of the vehicle, and one of said main engine or said electric drive being couplable to said ring gear of said planetary gear so as to enable the addition of the revolutions respectively generated by each of said main engine and said electric drive when in another driving mode corresponding to a second range of speed of the vehicle; and
    at least one brake being operable to fix said ring gear of said planetary gear while in the first driving mode.

2. A hybrid drive according to claim 1, further comprising at least one additional clutch, said brake being releasable in a temporal course of a shifting process of said least one additional clutch for generating said another driving mode.

3. A hybrid drive according to claim 2, wherein said at least one additional clutch includes a wet multiple plate clutch.

4. A hybrid drive according to claim 1, wherein said at least one brake includes a wet multiple disk brake.

5. A hybrid drive according to claim 1, further comprising a drive element being engaged with said ring gear of the planetary gear and which is arranged on said second drive shaft of said electric drive.

6. A hybrid drive according to claim 1, further comprising at least one additional clutch being provided between said second drive shaft of said electric drive and said planetary gear.

7. A method of controlling a transmission for a hybrid drive that includes at least a main machine and an electric drive which are connectable to one another via a clutch and at least one planetary gear that includes at least one drive shaft and a ring gear fixable via at least one brake, the method comprising:
    switching together said at least main machine and the electric drive in a first driving mode corresponding to a first range of speed of a vehicle using the transmission such that torque is added; and
    switching one of said at least main machine and the electric drive via at least one additional clutch such that in another driving mode corresponding to a second range of speed of the vehicle, said one of said at least main machine and the electric drive is coupled to said ring gear of said at least one planetary gear such that said at least main machine and the electric drive are operated in a manner in which revolutions generated by each of said main machine and the electric drive are added together to generate a combined total speed.

8. A method according to claim 7, further comprising releasing said brake in a temporal course of said shifting of said clutch.

9. A method according to claim 7, further comprising activating said hybrid drive using electronics acting as engine management such that operation of said hybrid drive is optimized in terms of consumption.

10. A method according to claim 7, further comprising activating said hybrid drive using electronics acting as engine management such that said hybrid drive is operated in a mode for maximum acceleration ability.

11. A method according to claim 7, wherein:
   said main machine comprises an internal combustion engine.

* * * * *